No. 690,817. Patented Jan. 7, 1902.
S. B. ALLISON.
MACHINE FOR SEPARATING FIBER FROM STALKS.
(Application filed Feb. 13, 1900.)
(No Model.) 2 Sheets—Sheet 2.
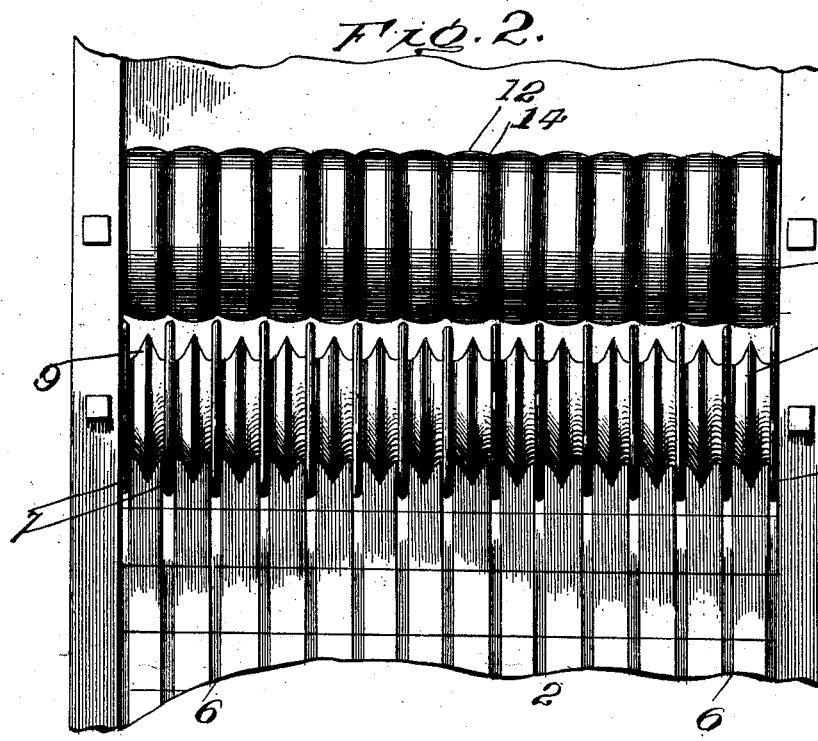
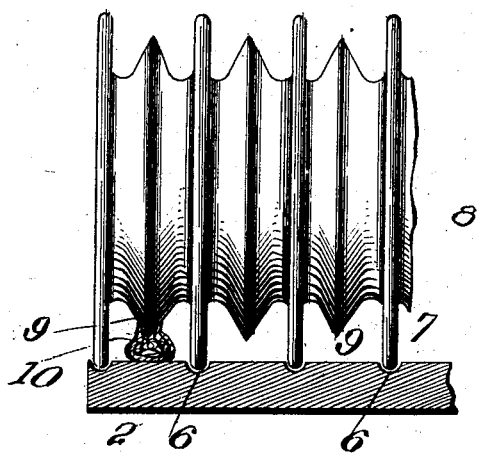
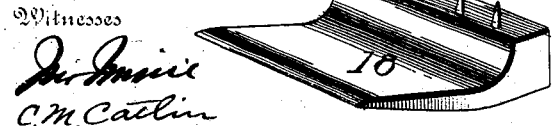
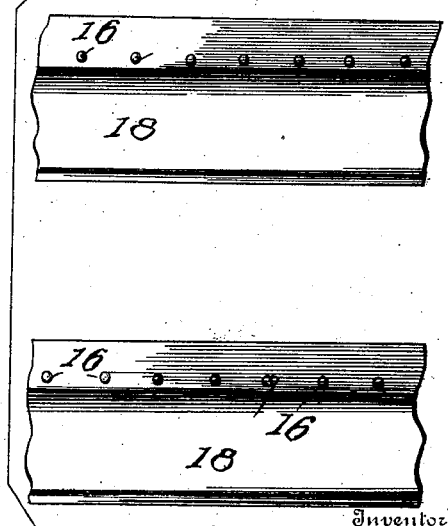
Witnesses
C. M. Catlin
Inventor
S. B. Allison
by
Benj. R. Catlin
Attorney

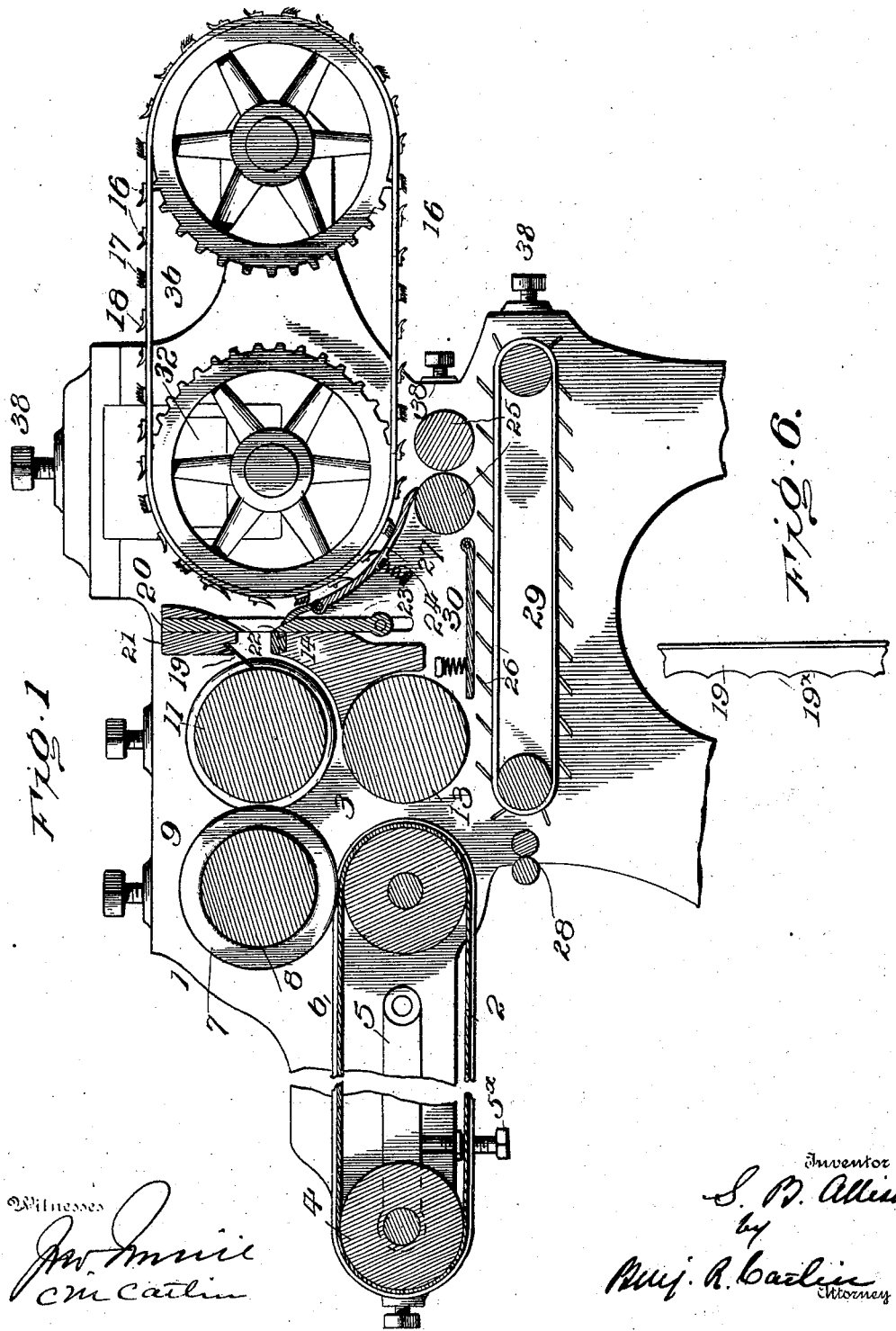

UNITED STATES PATENT OFFICE.

SAMUEL B. ALLISON, OF GALVESTON, TEXAS; C. A. DORRESTEIN ADMINISTRATOR OF SAID ALLISON, DECEASED.

MACHINE FOR SEPARATING FIBER FROM STALKS.

SPECIFICATION forming part of Letters Patent No. 690,817, dated January 7, 1902.

Application filed February 13, 1900. Serial No. 5,101. (No model.)

*To all whom it may concern:*

Be it known that I, SAMUEL B. ALLISON, a resident of Galveston, in the county of Galveston and State of Texas, have invented certain new and useful Improvements in Machines for Separating Fiber from Stalks and the Like; and I do hereby declare the following to be a full, clear, and exact description of the invention, such as will enable others skilled in the art to which it pertains to make and use the same.

The invention relates to machines for separating fiber from stalks and leaves of plants, such as ramie, flax, sisal, pineapple, and the like. Its object is to simplify the mechanism and increase the efficiency of such machines; and it consists in the construction hereinafter described and particularly pointed out.

In the accompanying drawings, Figure 1 is a longitudinal section of the improved machine. Fig. 2 is a partial plan of a feed-belt, guiding knife-carrying roller, and a stalk-flattening roller. Fig. 3 is a partial elevation of the guiding knife-carrying roller, the feeding-belt being indicated in section. Fig. 4 comprises partial opposite plans of a scraping-blade with combing-pins. Fig. 5 is a perspective of a scraping-blade. Fig. 6 is a broken plan of a roller-cleaning blade.

Numeral 1 denotes the frame of the machine, and 2 an endless grooved feed-belt made of metal or other suitable material and driven by sprocket wheels or rollers 3 and 4. Roller 3 has suitable bearings in said frame, and roller 4 is supported in a folding frame-section, having a hinge connection at 5 with the main frame, and is adjustable in a vertical direction by means of a screw or screws $5^\times$.

6 denotes grooves formed in the exterior of the belt, which register with and receive the rings or annular flanges 7 of a roller 8. The separate stalks are held and guided between said flanges 7, and fixed to the roller are situated annular slitting-blades 9, which slit or split the upper side of the stalks and open them. A stalk slit by said blades is denoted by 10. The stalks will be guided by and between the flanges 7 and under the rotating blades, which cut and open them approximately along their upper central lines.

The distance between proximate flanges 7 will in practice be varied to suit the material which the machine is designed to act upon, and in considering such distance and the average size of stalks the stalk-joints will be regarded and also the usual small departure in solid stalks from a straight longitudinal line.

The separating of the split parts of a stalk under the action of a blade and the spreading effect of the latter in the elastic woody material tend to prevent cutting across the grain, so that an approximately central initial opening of the upper side of the stalk is produced.

11 denotes a roller provided with stalk-opening or stalk-flattening faces 12, corresponding in number to the splitting-blades. It coöperates with rollers 3 and 13 to open the split stalks and flatten them, leaving the wood in a layer above and the fiber below.

The split, opened, and flattened stalks are broken across the upper edge of block 14 by the blades carried by the endless belt 36, which blades also scrape off the wood. The pins 16 comb the material as it descends along the proximate face of a working bed 27.

18 denotes concavities in the blades to temporarily receive refuse in front of the teeth. 17 denotes brushes situated intermediate the scraping-blades provided with the pins.

19 denotes a scraping-plate and guide to direct the material away from roller 11. This has curved parts $19^\times$, (see Fig. 6,) corresponding to the stalk-opening faces 12 of roller 11. It is fixed to a cross-bar 21.

20 denotes a scutching-blade adapted to be reciprocated to cause its edges 22 to act on the material diverted by the plate 19 between the bar 21 and the block 14. In the present instance the scutching-blade plays in a slot in the bar 21 and contiguous the block 14, the upper edge of which supports the flattened stalks, which have been deflected by the inclined surface of plate 19. The devices, including rollers 25, which act on the material after it passes this support, pull it over said support in manner to break and separate the wood. It is not essential that bar 21 and block 14 be formed of separate pieces.

At 23 is pivotally supported a working bed 27, curved to correspond to the path of the tools carried by the belt 36. Said bed may be held to its work in any suitable manner, as by springs 24, between the bed and frame.

25 denotes rollers, which conduct the material from the delivery end of the bed 27 to the path of blades 26, carried by an endless belt 29.

30 denotes a pivoted plate coöperating with the endless belt 29 and its blades to remove fine refuse from the fiber, and 28 are rollers to draw the material out of the machine. The plate 30 may be held to its work by a spring, as indicated.

38 denotes screw-bolts for adjusting the bearings of various rollers. Said screws may engage a block, such as indicated at 32, behind the journal-bearing block, the parts being of known construction.

The material is acted upon by the various mechanisms in continuous manner to avoid the straying of fiber, the wrapping of the shafts, and the production of tow.

The flanges 7 of roller 8 extend into the grooves in the belt and below its main upper surface. This construction prevents the lateral straying of the material or of any smaller parts thereof. The adjustability of the belt-roller 4 provides for producing a more or less close contact of said flanges with the bottom of the grooves.

The splitting and opening of stalks by the means and in the manner described places the wood above the fiber, whereby the wood after the material has been scutched by blade 20 is directly exposed to the tools carried by the endless belt 36. These and other operations and advantages are obvious from the description and drawings and need not be more fully set forth herein.

Mechanical variations in parts of the machine not substantially affecting its principles of operation and construction may be made, and it will be understood that usual adjuncts of such machines known to those skilled in the art can be supplied in the customary manner.

Having thus described my invention, what I claim as new, and desire to secure by Letters Patent, is—

1. In a machine for separating fiber, the combination of the several blades to split each one side of a stalk, an endless feeding-belt, a stalk supporting and guiding roller coacting with the belt and having grooves embracing each a stalk and holding them against the transverse action of the knives, and the flattening and breaking rollers situated in proximity to the blades.

2. In a machine for separating the fiber of plants, the combination of a grooved feeding-belt, and a roller having annular guides registering with the belt-grooves.

3. In a machine for separating the fiber of plants, the combination of a stalk-feeding device, a blade to split a stalk, and a stalk-support, the operative edge of the blade being supported out of contact with the stalk-support to avoid splitting both sides of said stalk.

4. In a machine for separating the fiber of plants, the combination of a stalk-feeding device, a plurality of blades, a stalk-support, devices for separating the stalks and guiding them individually under the several blades.

5. In a machine for separating the fiber of plants, the combination of a stalk-feeding device, a plurality of blades, a stalk-support, devices for separating the stalks and guiding them individually under the several blades, a stalk opening and flattening roller having operative faces corresponding in number and plane of rotation with the blades, and a roller coöperating with said stalk-opening roller.

6. In a machine for separating the fiber of plants, the combination of stalk splitting and opening devices, a block having a working bed, wood and fiber separating blades, pins to follow the blades, and brushes to follow the pins, said splitting and opening devices being adapted to present the woody side of stalks to said blades, pins and brushes to separate the wood.

7. In a machine for separating the fiber of plants, the combination of the wood and fiber separating blades, a block having a working bed, means for presenting the woody side of stalks to said blades to separate the wood, pins to follow the blades, and brushes to follow the pins, both devices acting on the material, the pins of said blades being arranged to travel in laterally-alternating paths to straighten and open the material preparatory to the action of the brushes.

8. In a machine for separating the fiber of plants, the combination of coacting rollers, a block having a working bed conformed to one of the rollers and extending to near their approximate lines, a reciprocating scutcher, a hinged plate to receive the fiber from said scutcher, and a tool-carrying belt coacting with the bed.

9. In a machine for separating the fiber of plants, in combination with a working bed, the wood-separating blades carrying combing-pins fixed thereto behind the edges of the blades.

10. In a machine for separating the fiber of plants, in combination with a working bed, the wood-separating blades carrying combing-pins fixed thereto behind the edges of the blades, said blades being concave between said edges, and pins to provide receptacles for fine refuse combed out by the pins.

11. The combination of a scutching device, an endless belt carrying tools adjacent the scutcher, a bed to coact with said tools, a second endless belt carrying blades, a bed coacting with the blades and devices intermediate the belts to convey the material from one to the other.

12. The combination of a scutching device, an endless belt carrying tools adjacent the scutcher, a bed to coact with said tools, a second endless belt carrying blades, a bed coacting with the blades and devices intermediate the belts to convey the material from one to the other, the tools and blades being arranged and adapted to act upon the same side of the material.

In testimony whereof I have signed this specification in the presence of two subscribing witnesses.

SAMUEL B. ALLISON.

Witnesses:
J. W. POINDEXTER,
BENJ. R. CATLIN.